(12) United States Patent
An et al.

(10) Patent No.: US 9,292,132 B2
(45) Date of Patent: Mar. 22, 2016

(54) MULTITOUCH RECOGNIZING DEVICE

(75) Inventors: Suk Min An, Seoul (KR); Hong Hee Han, Gwangmyeong-si (KR); Gu Berm Jung, Bucheon-si (KR)

(73) Assignee: RNDPLUS CO., LTD., Goyang-si, Gyeonggi-do (KR)

( * ) Notice: Subject to any disclaimer, the term of this patent is extended or adjusted under 35 U.S.C. 154(b) by 108 days.

(21) Appl. No.: 14/130,454

(22) PCT Filed: Jun. 29, 2012

(86) PCT No.: PCT/KR2012/005172
§ 371 (c)(1),
(2), (4) Date: Dec. 31, 2013

(87) PCT Pub. No.: WO2013/005949
PCT Pub. Date: Jan. 10, 2013

(65) Prior Publication Data
US 2014/0146020 A1    May 29, 2014

(30) Foreign Application Priority Data

Jul. 1, 2011 (KR) .................. 10-2011-0065415
Sep. 2, 2011 (KR) .................. 10-2011-0088772

(51) Int. Cl.
*G06F 3/042* (2006.01)
*G06F 3/041* (2006.01)

(52) U.S. Cl.
CPC ............ *G06F 3/0421* (2013.01); *G06F 3/0416* (2013.01); *G06F 3/0428* (2013.01); *G06F 2203/04109* (2013.01)

(58) Field of Classification Search
CPC .................... G06F 3/0421; G06F 2203/04104; G06F 2203/04109; G06F 3/042; G06F 3/0304; G06F 3/0308; G06F 17/12; G06F 3/0428; G06F 3/0423; G02F 1/13338
USPC .......................................................... 345/175
See application file for complete search history.

(56) References Cited

U.S. PATENT DOCUMENTS

| | | | |
|---|---|---|---|
| 6,429,857 B1* | 8/2002 | Masters et al. ................. | 345/175 |
| 8,581,884 B2* | 11/2013 | Fahraeus et al. ............... | 345/176 |
| 8,633,918 B2* | 1/2014 | Kim et al. ...................... | 345/176 |
| 8,780,087 B2* | 7/2014 | Kim .............................. | 345/175 |
| 2002/0067348 A1* | 6/2002 | Masters et al. ................. | 345/175 |
| 2003/0063073 A1* | 4/2003 | Geaghan et al. ............... | 345/173 |
| 2010/0026666 A1* | 2/2010 | Ho ................................ | 345/175 |
| 2011/0074735 A1* | 3/2011 | Wassvik et al. ............... | 345/175 |
| 2011/0084939 A1* | 4/2011 | Gepner ................. | G06F 3/0421 345/175 |
| 2011/0221997 A1* | 9/2011 | Kim et al. ..................... | 349/62 |
| 2011/0227874 A1* | 9/2011 | Fahraeus et al. .............. | 345/175 |
| 2011/0261020 A1* | 10/2011 | Song ..................... | G06F 3/0421 345/175 |

(Continued)

FOREIGN PATENT DOCUMENTS

| | | | |
|---|---|---|---|
| KR | 10-2010-0038012 A | 4/2010 | |
| KR | 10-2010-0058397 A | 6/2010 | |

(Continued)

*Primary Examiner* — Temesgh Ghebretinsae
*Assistant Examiner* — Michael J Jansen, II
(74) *Attorney, Agent, or Firm* — JaeYoun Kim; Novick, Kim & Lee, PLLC

(57) ABSTRACT

A multi-touch recognizing device for distinguishing an illusion from an actually touched position and an illusion position by using an inclination angle measuring method, minimizing time for measuring a touch position, and more accurately measuring the position is provided.

14 Claims, 14 Drawing Sheets

(56) References Cited

U.S. PATENT DOCUMENTS

| | | | | |
|---|---|---|---|---|
| 2012/0105377 A1* | 5/2012 | Takeno | ............... | G06F 3/0421 345/175 |
| 2012/0218215 A1* | 8/2012 | Kleinert et al. | ............... | 345/173 |
| 2012/0218230 A1* | 8/2012 | Zhao et al. | ............... | 345/175 |
| 2012/0299879 A1* | 11/2012 | Kim | ............... | 345/175 |
| 2013/0127763 A1* | 5/2013 | Gepner | ............... | G06F 3/017 345/173 |
| 2013/0234993 A1* | 9/2013 | Zhang et al. | ............... | 345/175 |
| 2013/0249833 A1* | 9/2013 | Christiansson et al. | ............... | 345/173 |
| 2015/0016777 A1* | 1/2015 | Abovitz et al. | ............... | 385/37 |

FOREIGN PATENT DOCUMENTS

| | | |
|---|---|---|
| KR | 10-1018397 B1 | 2/2011 |
| KR | 10-2011-0057146 A | 5/2011 |
| WO | 2011-054278 A1 | 5/2011 |

\* cited by examiner

MULTITOUCH RECOGNIZING DEVICE

TECHNICAL FIELD

The present invention relates to a multitouch recognizing device that is capable of differentiating between a real image, which is really touched, and a ghost image, which is not really touched, on a touch screen device for determining whether objects interfere with a course of a touch measurement signal, such as infrared light, on a touch surface to measure positions of the objects and that is capable of improving touch measurement calculation speed to correctly recognize a touch position touched by a user even when the touch position is rapidly changed.

BACKGROUND ART

In infrared touch technology, the position of an object is measured based on determination as to whether infrared light is interfered with by the object.

An infrared signal used in the above method is an alternating current signal of several tens to several hundreds of KHz. Infrared signals are transmitted and alternating current signals collected depending on presence or absence of an object are averaged to measure magnitude of the signals.

In the above method, however, time to average the collected alternating current signals is necessary and frequency response of infrared touch measurement signal receiving units is considerably reduced due to high-frequency signals. As a result, sensitivity and overall response speed are lowered. Furthermore, different light sources operated in a light transmitting unit and a light receiving unit interfere with each other and, therefore, it is not possible for the light receiving unit to correctly receive signals. As a result, it is not possible to correctly calculate coordinates. In addition, in a case in which infrared signals are emitted between the light transmitting unit and the light receiving unit, a portion at which presence or absence of an object is not determined, i.e. ghost coordinates, may be generated at covered coordinates.

In order to solve the above problem, there has been proposed Korean Registered Patent No. 10-1018397 which discloses an apparatus and method for removing a ghost image. According to this disclosure, a first scan control mode is executed to remove a ghost image and, when multiple touches are sensed, a second scan control mode is additionally executed.

FIG. 14 is a view schematically showing construction of an infrared touch screen device that is capable of removing a ghost image disclosed in Korean Registered Patent No. 10-1018397.

According to the method disclosed in Korean Registered Patent No. 10-1018397, however, multiple touches may not be correctly recognized even when the multiple touches are actually generated in the first scan control mode.

Specifically, according to the method disclosed in Korean Registered Patent No. 10-1018397, in a case in which a new touch is generated, the first scan control mode is executed. In a case in which the touch is recognized as multiple touches, the second scan control mode is additionally executed to remove an object determined as a ghost image from the multiple touches. If the multiple touches frequently or rapidly move, even when subsequent multiple touches are generated during execution of the second scan control mode, it is not possible to perform switching to the first scan control mode with the result that it may not be possible to measure the subsequent multiple touches.

DISCLOSURE

Technical Problem

The present invention has been made in view of the above problems and it is an object of the present invention to provide a multitouch recognizing device that is capable of differentiating between a real touch position and a ghost image position in a case in which multiple touches are generated on a touch screen device.

Furthermore, the present invention has been made in view of the above problems and it is another object of the present invention to provide a multitouch recognizing device that is capable of differentiating a ghost image using an inclination angle measurement method.

In addition, it is a further object of the present invention to provide a multitouch recognizing device that is capable of minimizing time necessary to measure a touch position.

Technical Solution

In accordance with an aspect of the present invention, the above objects can be accomplished by the provision of a multitouch recognizing device including a plurality of transmitting unit groups constituted by grouping touch measurement signal transmitting units for radially transmitting successive touch measurement signals to receiving module groups, a plurality of receiving module groups including at least three receiving modules located at a right angle, an acute angle, and an obtuse angle to the transmitting unit groups for simultaneously receiving the touch measurement signals transmitted by the transmitting unit groups such that each of the receiving modules simultaneously receive the touch measurement signals at the right angle, the acute angle, and the obtuse angle, a transmitting unit driving clock unit for providing a driving clock to simultaneously drive the touch measurement signal transmitting units having the same index in each of the transmitting unit groups, a control unit for calculating x and y coordinates or a diameter of a touch region based on the touch measurement signals received by the receiving module groups, and a touch panel for allowing a user to input an touch input.

In accordance with another aspect of the present invention, the above objects can be accomplished by the provision of a multitouch recognizing device including a transmitting module including at least one transmitting element for radially transmitting a touch measurement signal including a pulse, a receiving module including at least one receiving element for receiving the touch measurement signal transmitted by the transmitting module, a control unit for calculating coordinates or a diameter of a touch region based on the touch measurement signal received by the receiving module groups, and a touch panel for allowing a user to input an touch input, wherein the receiving elements located at a right angle, an obtuse angle, and an acute angle to the transmitting element successively receive touch measurement signal radially transmitted by the transmitting element as an orthogonal, acute, or obtuse touch measurement signal.

Advantageous Effects

In the multitouch recognizing device with the above-stated construction according to the present invention, it is possible to efficiently differentiate between real multi touch positions and a ghost image position in a case in which multi touches are generated on a multitouch screen device. In addition, it is possible to efficiently differentiate a ghost image using an inclination angle measurement type multitouch position measurement method and a reference coordinate calculation method. Furthermore, time necessary to measure the multitouch positions is minimized and, therefore, it is possible to effectively measure the multiple touches if the multiple touches rapidly move or change.

BEST MODE

Reference will now be made in detail to the preferred embodiments of the present invention, examples of which are illustrated in the accompanying drawings such that the present invention can be easily implemented by a person having an ordinary skill in the art to which the present invention pertains. However, the present invention may be implemented in various different forms and is not limited to the following embodiments. Parts of the drawings irrelevant to the description of the present invention are omitted to clearly explain the present invention. The same reference numbers will be used throughout this specification to refer to the same or like parts.

In a case in which a part "includes" a component through this specification, this means that the part may not exclude another component but may further include another component unless otherwise mentioned. In addition, the terms " . . . unit", " . . . module", " . . . element", etc. described in this specification mean a unit device for processing at least one function or operation. This unit device may be implemented by hardware, software, or a combination of the hardware and the software.

Figure 1:
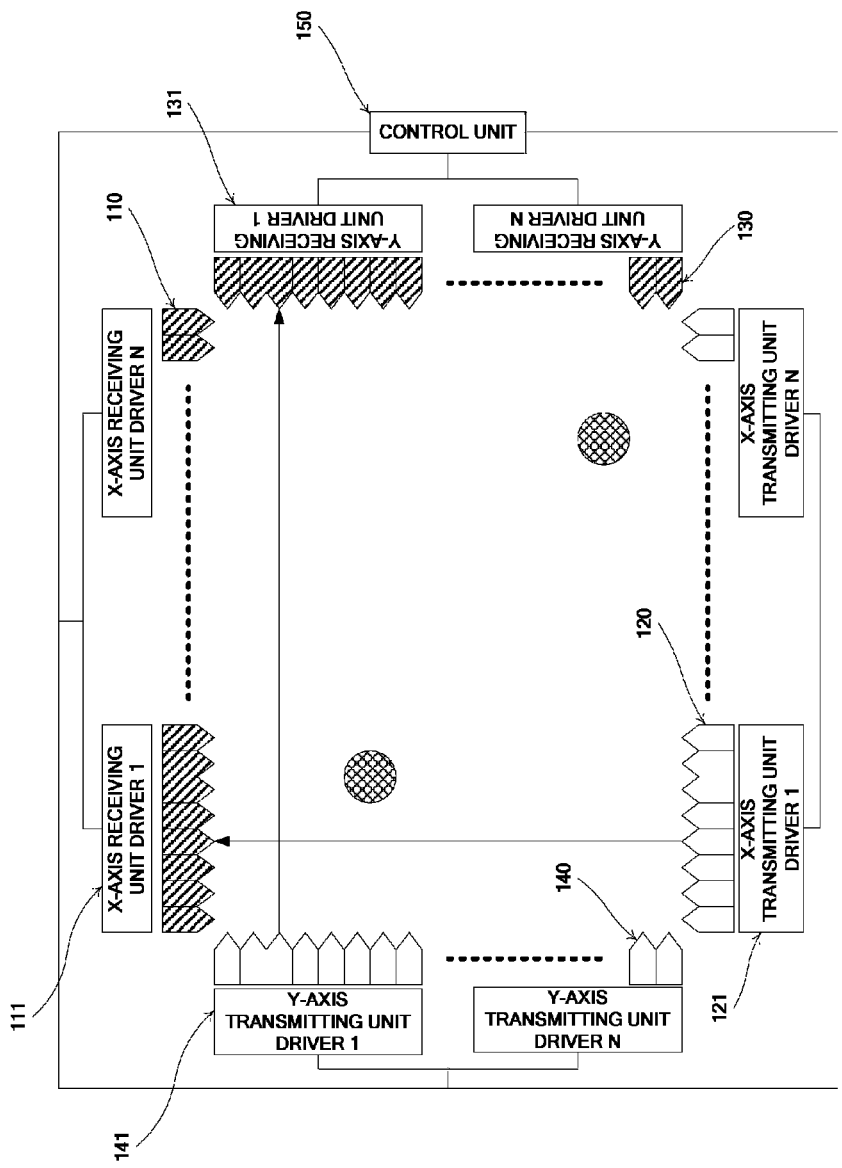
FIG. 1 is a view schematically showing construction of a multitouch recognizing device according to an embodiment of the present invention.

FIG. 1 is a view schematically showing construction of a multitouch recognizing device according to the present invention.

The multitouch recognizing device according to the present invention includes X-axis touch measurement signal receiving units 110, X-axis touch measurement signal transmitting units 120, Y-axis touch measurement signal receiving units 130, Y-axis touch measurement signal transmitting units 140, X-axis receiving unit drivers 111, X-axis transmitting unit drivers 121, Y-axis receiving unit drivers 131, Y-axis transmitting unit drivers 141, and a control unit 230.

At least two X-axis touch measurement signal receiving units 110 are successively arranged to constitute a universal receiving unit, which receives infrared light transmitted by a transmitting unit. At least two X-axis touch measurement signal transmitting units 120 are successively arranged to transmit touch measurement signals to a touch surface on the X-axis touch measurement signal receiving units 110.

At least two Y-axis touch measurement signal receiving units 130 are successively arranged to constitute a universal receiving unit, which receives infrared light transmitted by a transmitting unit. At least two Y-axis touch measurement signal transmitting units 140 are successively arranged to transmit touch measurement signals to a touch surface on the Y-axis touch measurement signal receiving units 130.

The X-axis and Y-axis transmitting unit drivers 121 and 141 drive the X-axis and Y-axis touch measurement signal transmitting units 120 and 140 at predetermined time intervals to transmit touch measurement signals, such as infrared signals, to a touch surface of a multitouch screen. The X-axis and Y-axis receiving unit drivers 121 and 141 drive the X-axis and Y-axis touch measurement signal receiving units 110 and 130 at predetermined time intervals to receive touch measurement signals, such as infrared signals, and external noise signals, such as solar light and low-frequency noise.

In the above, the infrared signals are used as the touch measurement signals. However, it should be noted that radio frequency (RF) signals or light emitting diode (LED) light emitting signals may be used as the touch measurement signals.

In FIG. 1, the transmitting units and the receiving units are opposite to each other. That is, transmitting modules are arranged at one side and receiving modules are arranged at the other side. However, it should be noted that the transmitting modules and the receiving modules may be alternately arranged at each side as needed.

The control unit 150 processes touch measurement signals received by the X-axis touch measurement signal receiving units 110 and the Y-axis touch measurement signal receiving units 130 to calculate characteristics of a point on a touch panel touched by a user.

As the characteristics of the touch point, not only X-axis and Y-axis coordinates of the touch point but also the size, such as a diameter, of the touch point may be calculated.

According to the present invention, the X-axis touch measurement signal receiving units 110 and the X-axis touch measurement signal transmitting units 130 are configured to have N transmitting elements and receiving units arranged on the horizontal axis and the Y-axis touch measurement signal receiving units 120 and the Y-axis touch measurement signal transmitting units 140 are configured to have M transmitting elements and receiving units arranged on the vertical axis.

In another example, in a case in which the X-axis touch measurement signal receiving units 110 and the X-axis touch measurement signal transmitting units 130 are alternately arranged, the sum of the X-axis touch measurement signal receiving units 110 and the X-axis touch measurement signal transmitting units 130 is a total of 2N, wherein one N is located at one side of the horizontal axis and the other N is located at the other side of the horizontal axis, and the sum of the Y-axis touch measurement signal receiving units 120 and the Y-axis touch measurement signal transmitting units 140 is a total of 2M, wherein one M is located at one side of the vertical axis and the other M is located at the other side of the vertical axis.

A method of calculating the characteristics of a touch point, i.e. coordinates and size of a touch region, in the multitouch recognizing device according to the present invention with the above-stated construction will be described.

First, it is defined that the size of infrared light received by the horizontal-axis (X-axis) touch measurement signal receiving units facing each other is X(0), the size of infrared light received by the second touch measurement signal receiving unit is X(1), the size of infrared light received by the third touch measurement signal receiving unit is X(2), the size of infrared light received by the k-th receiving module is X(k−1), and the size of infrared light received by the N-th receiving module is X(N−1).

In addition, it is defined that the size of infrared light received by the receiving unit of the vertical-axis (Y-axis) receiving module is Y(0), the size of infrared light received by the receiving unit of the second receiving module is Y(1), the size of infrared light received by the receiving unit of the third receiving module is Y(2), the size of infrared light received by the receiving unit of the k-th receiving module is Y(k−1), and the size of infrared light received by the receiving unit of the M-th receiving module is Y(M).

In order to determine whether touch measurement signals transmitted by the transmitting units are interfered with by objects for recognizing a touch input, the respective X-axis touch measurement signal receiving units sequentially perform scanning from 0 to N−1. For Y(k), scanning is sequentially performed from 0 to M−1.

On the assumption that received values of the touch measurement signal received by the touch measurement signal receiving unit through the k-th scanning is X(k−1) and Y(k−1), the received values of the touch measurement signals according to the respective scanning may be obtained from all of the touch measurement signal receiving units while changing k from 1 to N for the X axis and from 1 to M for the Y axis and coordinates and diameters of the objects obstructing movement of the touch measurement signals transmitted by the touch measurement signal transmitting units may be calculated using the above values.

First, the received values of the touch measurement signals are normalized using Equations 1 and 2.

$$N_x(k) = \frac{(X_{max}(k) - X(k))^n}{(X_{max}(k))^n} \times G \quad \text{Equation 1}$$

Where n is a natural number of 1 or 2, which decides whether to linearly or nonlinearly set a reaction degree of a noise component of a signal. In a case in which n=1, it is advantageous to calculate a signal having a low background noise component. In a case in which n>1, it is advantageous when a background noise signal is high.

G is a scaling value, which is generally set to 1 or 100. The measurement value calculated by Equation 1 is a value obtained by normalizing the measurement values for the X axis. For the Y axis, coordinates may be calculated in the same manner as for the X axis.

$$N_y(k) = \frac{(Y_{max}(k) - Y(k))^n}{(Y_{max}(k))^n} \times G \quad \text{Equation 2}$$

The measurement value calculated by Equation 2 is a value obtained by normalizing the measurement values for the Y axis.

In the above, $X_{max}$ and $Y_{max}$ are defined as the largest values of the touch signals measured at the X axis and the Y axis, respectively.

Equation 3 and Equation 4 below are given as formulae for calculating coordinates of the touch region using the normalized measurement value.

An n-th X coordinate is calculated using Equation 3 below and an n-th Y coordinate is calculated using Equation 4 below.

$$x(n) = \frac{\sum_{i}^{i+w} W \times (i+1) \times N_x(i)}{\sum_{i}^{i+w} N_x(i)} \quad \text{Equation 3}$$

$$y(n) = \frac{\sum_{j}^{j+h} H \times (j+1) \times N_y(j)}{\sum_{j}^{j+h} N_y(j)} \quad \text{Equation 4}$$

Where i is a natural number of 1 to N, j is a natural number of 0 to M, w is the number of X-axis touch region receiving units, and h is the number of Y-axis touch region receiving units.

Meanwhile, Equation 5 and Equation 6 below are given as formulae for calculating a diameter of the touch region using the normalized measurement value.

That is, a diameter of the n-th X coordinate is calculated using Equation 5 below and a diameter of the n-th Y coordinate is calculated using Equation 6 below.

$$dx(n) = \sum_{i}^{i+w} W \times N_x(i) \quad \text{Equation 5}$$

$$dy(n) = \sum_{i}^{i+h} H \times N_y(i) \quad \text{Equation 6}$$

Where i is a natural number of 1 to N, j is a natural number of 0 to M, w is the number of X-axis touch region receiving units, and h is the number of Y-axis touch region receiving units.

Meanwhile, in the multitouch recognizing device according to the present invention, $N_x(k)$ and $N_y(k)$ obtained by normalizing the measurement values measured by the touch measurement signal receiving units are calculated to recognize the touch region. A case in which the value is greater than a first reference value $T_{lower}$ is measured and the coordinates and diameter are calculated from successively obtained values, of which at least one value satisfies a condition that a second reference value $T_{higher} > N_x(k), N_y(k)$ using Equations 3 to 6 above.

In the above equations, W=S/N and H=S/M. S is the maximum resolution of a screen and N and M are the number of touch measurement signal receiving and transmitting units of X and Y axes, respectively.

In another embodiment, probability density value at the touch region may be measured to decide validity of the touch coordinates.

Specifically, the probability density values of the touch region are defined as represented by Equations 7 and 8.

$$T_x(n) = \left(\sum_{i}^{i+w} N_x(i)\right)/W \qquad \text{Equation 7}$$

$$T_y(n) = \left(\sum_{j}^{j+h} N_y(j)\right)/H \qquad \text{Equation 8}$$

Values decided by probability density functions specified by Equations 7 and 8 above may be set as the first reference value $T_{lower}$ and the second reference value $T_{higher}$ used in Equations 3 to 6.

Figure 2:
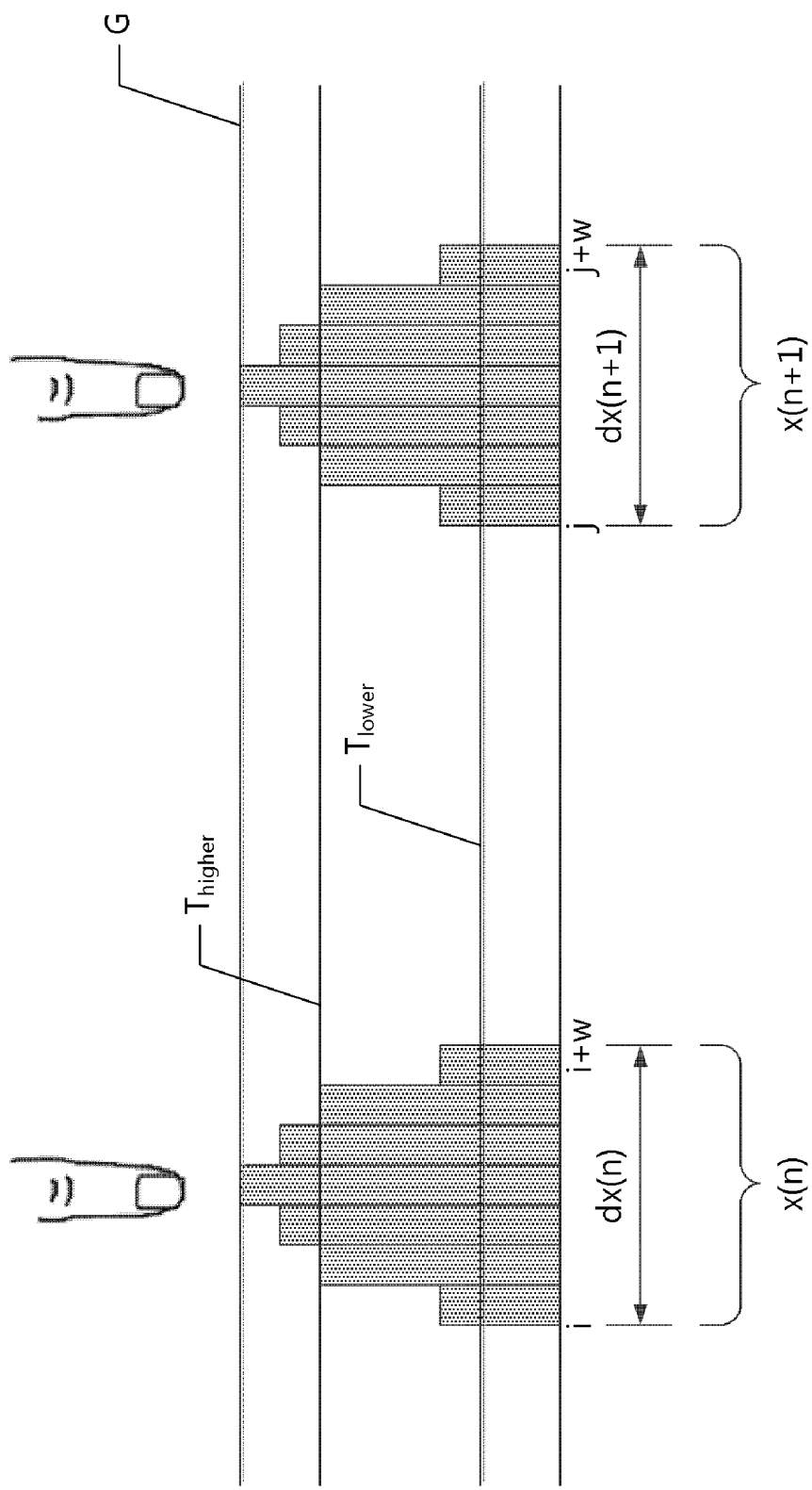
FIGS. 2 and 3 views illustrating a principle of recognizing a touch point in the multitouch recognizing device according to the present invention.
Figure 3:
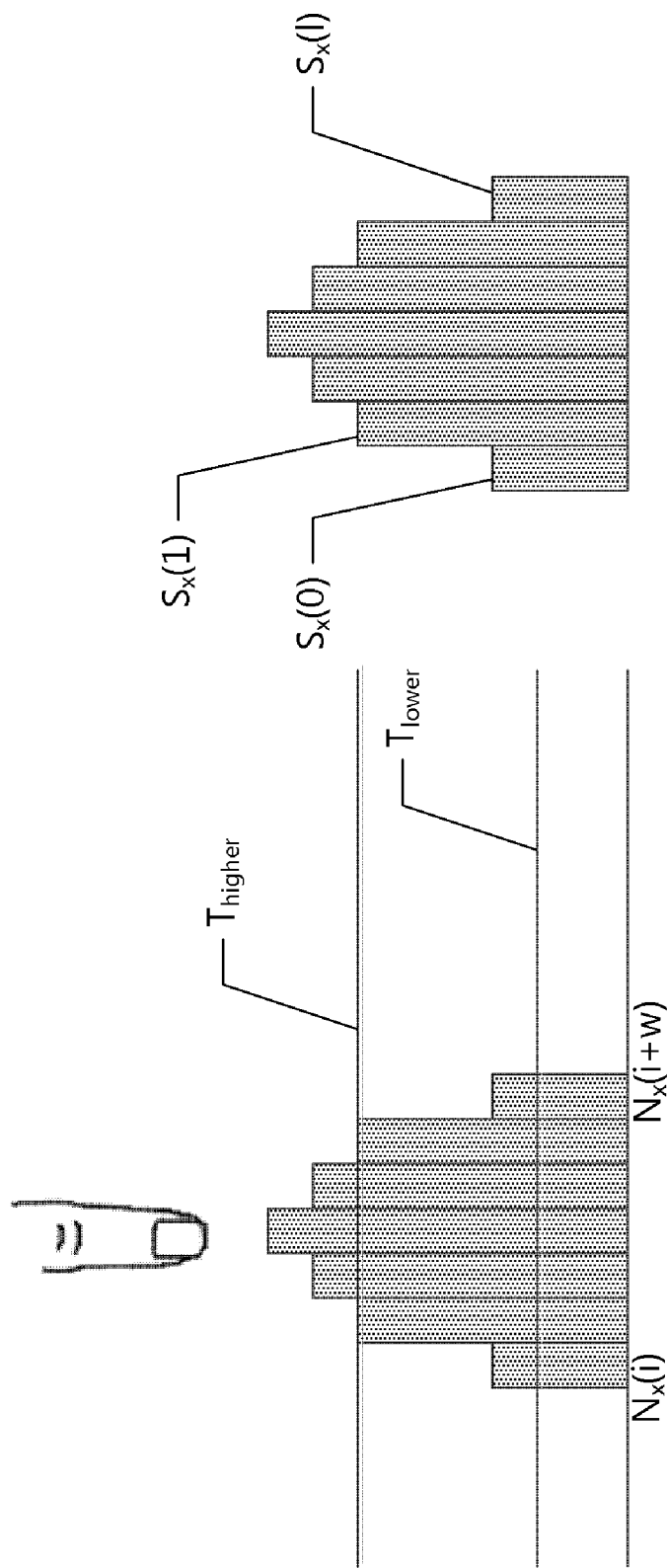
Figure 5:
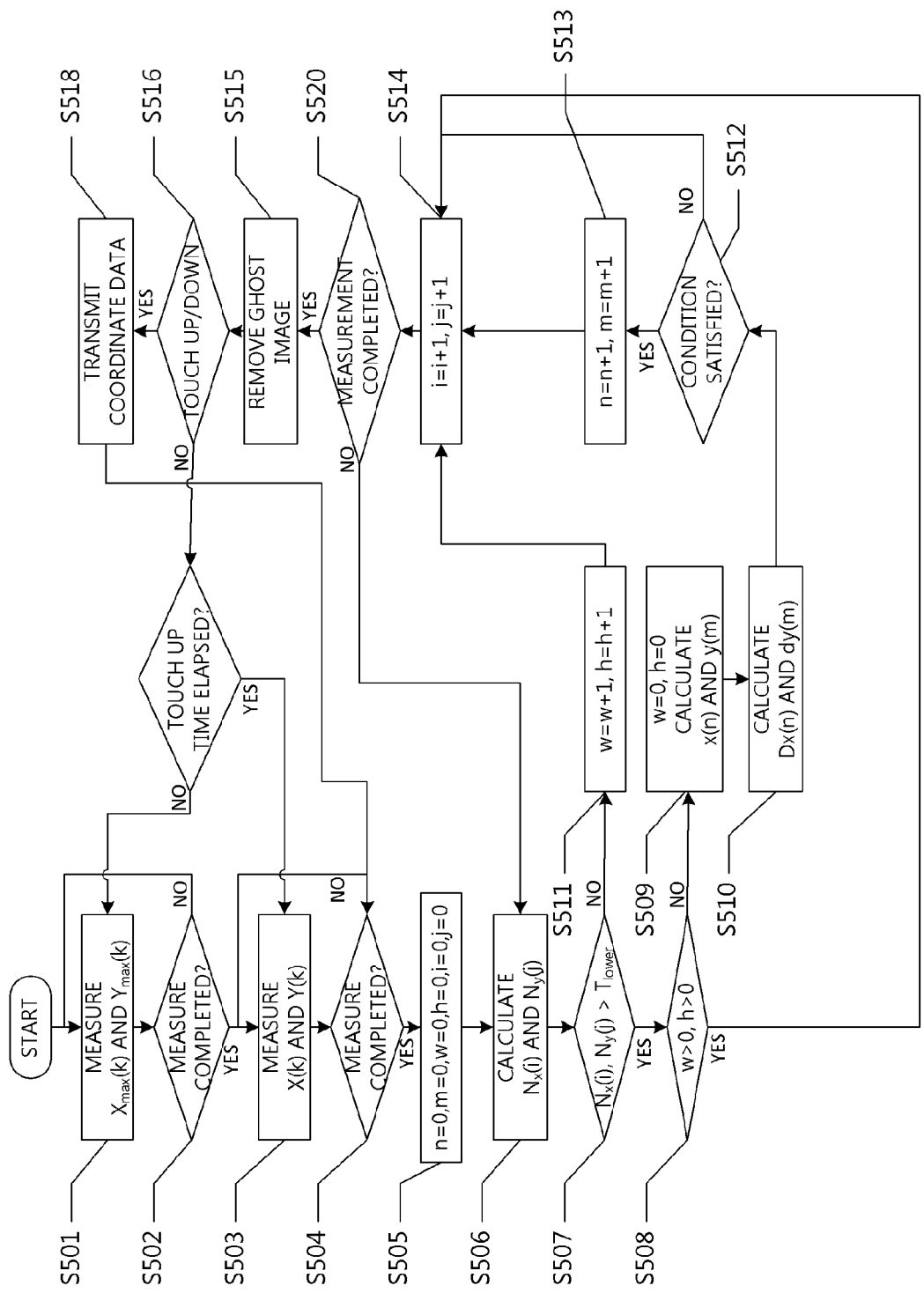
FIG. 5 is a flowchart showing a process of differentiating between a real touch point and a ghost touch point in the multitouch recognizing device according to the present invention.

FIGS. 2 and 3 views illustrating a principle of recognizing a touch point in the multitouch recognizing device according to the present invention and FIG. 5 is a flowchart showing a process of differentiating between a real touch point and a ghost touch point in accordance with a first embodiment of the present invention.

Hereinafter, a process of differentiating between a real touch point and a ghost touch point in the multitouch recognizing device according to the present invention will be described with reference to FIGS. 2 and 3.

First, the touch measurement signal receiving units measure values corresponding to the maximum values, i.e. $X_{max}(k)$ and $Y_{max}(k)$, among touch measurement signals transmitted by the touch measurement signal transmitting units (S501).

It is determined whether the measurement of $X_{max}(k)$ and $Y_{max}(k)$ has been completed. Upon determining that the measurement has been completed (S502), the procedure moves to step S503. At step S502, the measurement value means that an object interfering with infrared light is not present on the touch surface.

At step S503, it is measured whether touch measurement signals are received by the touch measurement signal receiving units. That is, each of the touch measurement signal receiving units measures $X(k)$ and $Y(k)$.

As step S504, it is determined whether the measurement has been completed. Upon determining that the measurement has been completed, the procedure moves to step S505.

At step S505, variables used to measure values, such as coordinates and a diameter, of the touch region are initialized. That is, the respective variables are set as follows: n=0, m=0, w=0, h=0, i=0, and j=0.

In the above, n is the number of coordinates and diameters of the touch point obtained at the X axis, m is the number of coordinates and diameters of the touch point obtained at the Y axis, i is an index of the sensor unit value X(k) of the X axis from 0 to N, j is an index of the sensor unit value Y(k) of the Y axis from 0 to M, W=S/N, and H=S/M. At this time, S is the maximum resolution of the screen.

At step S506, Equation 1 and Equation 2 above are calculated.

At step S507, the normalized $N_x(k)$ and $N_y(k)$ are calculated. In a case in which the values are greater than the first reference value $T_{lower}$, the procedure moves to step S511. In a case in which values are not greater than the first reference value $T_{lower}$, the procedure moves to step S508.

At step S508, it is determined whether values of W and H are zero. In a case in which the values are not zero, it is determined that pushing has been performed by touch and the procedure moves to step S514 for final calculation of coordinates. In a case in which the values are zero, the procedure moves to step S509.

At step S509, W and H are initialized and x(n) and y(m) are calculated using Equation 3 and Equation 4 above.

At step S510, W and H are initialized and dx(n) and dy(m) are calculated using Equation 5 and Equation 6.

At step S511, in a case in which $N_x(k)$ and $N_y(k)$ measured at step S507 are greater than first reference value $T_{lower}$, it is determined that the tough measurement signal has been interfered with and values of w and h are increased by 1.

At step S512, a condition that the calculated coordinates and diameter are restricted, for example, a condition that no touch is accepted due to one or more restrictions of a specific diameter is determined. In a case in which the condition is satisfied as the result of determination, the procedure moves to step S513. In a case in which the condition is not satisfied as the result of determination, coordinates information is deleted and the procedure moves to step S514. The condition may be a determination condition as in Equation 7 and Equation 8 above.

At step S513, index values of n and m are increased by 1. At step S514, index values of i and j are increased by 1.

At step S515, measurement of the touch measurement signals at the coordinates of n×m is completed and a ghost image, in which it is not possible to measure presence or absence of an object, is removed from the coordinates to differentiate only the coordinates of the real touch point.

At step S508, it is determined whether values of W and H are zero. In a case in which the values are not zero, it is determined that pushing has been performed by touch and the procedure moves to step S514 for final calculation of coordinates. In a case in which the values are zero, the procedure moves to step S509.

In a touch down state, the coordinates are transmitted to an information instrument and the procedure moves to step S503 to measure new coordinates.

At step S520, it is determined whether a condition that i=(N−1) is j=(M−1) is satisfied. In a case in which the condition is satisfied, which means that calculation of the measurements values for all touch measurement signals has been completed, the procedure moves to step S515. In a case in which the condition is not satisfied, the procedure moves to step S506, at which the next $N_x(k)$ and $N_y(k)$ are measured.

When touch up is continued for a predetermined time, the procedure moves to step S501, at which $X_{max}(k)$ and $Y_{max}(k)$ are measured again. Otherwise, the procedure moves to step S503.

Step S507 of FIG. 5 may be performed only for a touch region satisfying Equations 9 and 10 below.

$$P_x(k) = \sum_{i=0}^{l} N_x(k+i) \times S_x(i) \qquad \text{Equation 9}$$

$$P_y(k) = \sum_{i=0}^{l} N_y(k+i) \times S_y(i) \qquad \text{Equation 10}$$

Where Sx(i) and Sy(i) are matching filters having predetermined matching touch patterns and l is the sampling number of each of the matching filters.

The reason that the matching filters are applied as described above is that only a specific touch pattern among measured touch region values is recognized as a touch, thereby improving a rate of recognition of the touch region.

Figure 4:
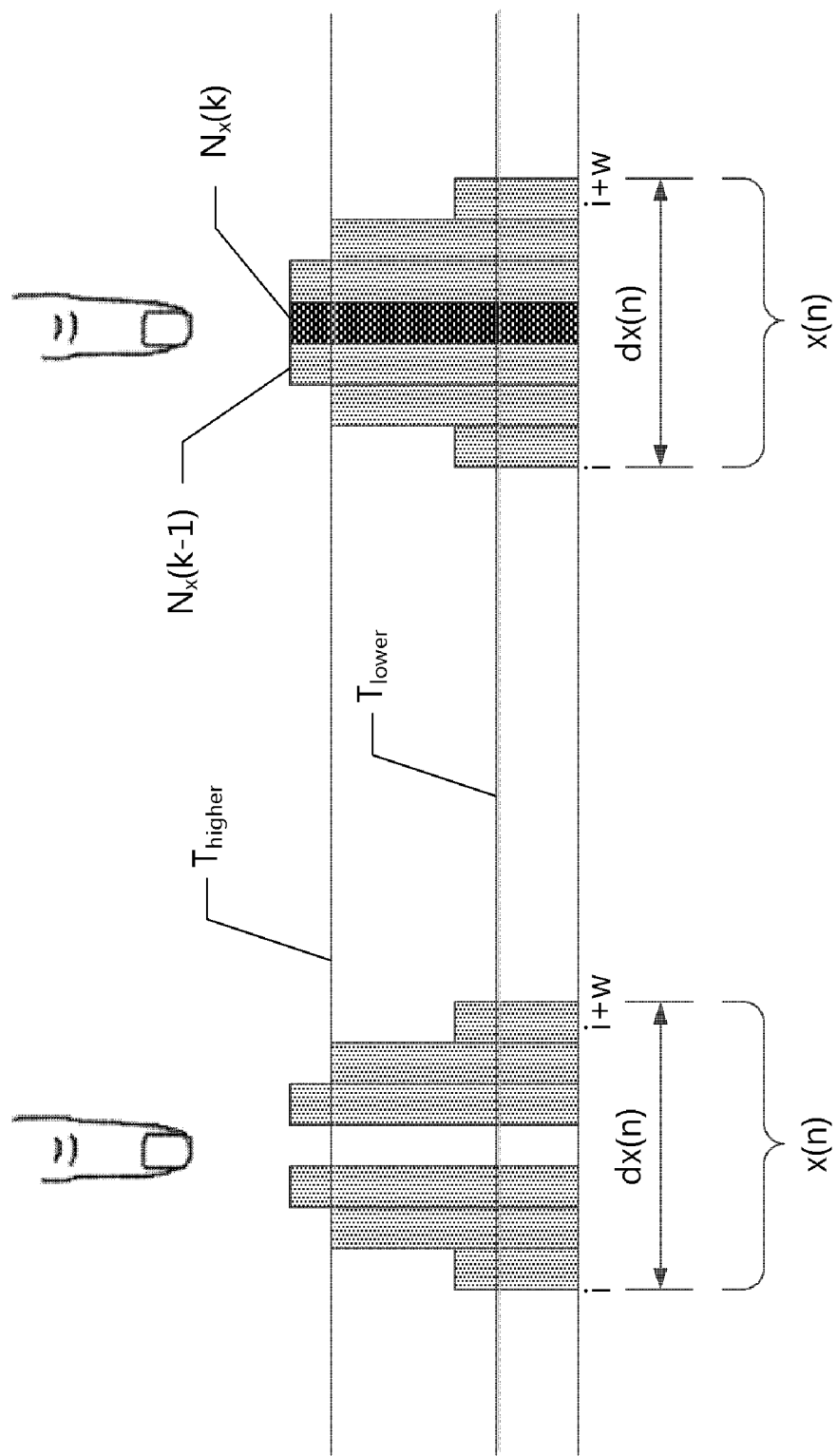
FIG. 4 is another view illustrating a principle of recognizing a touch point in a case in which a specific touch receiving and transmitting module malfunctions in the multitouch recognizing device according to the present invention.

FIG. 4 is another view illustrating a principle of recognizing a touch point in a case in which a specific touch receiving and transmitting module malfunctions in the multitouch recognizing device according to the present invention.

Generally, when infrared light hand touch measurement signal transmitting units malfunction, it is not possible to determine whether touch has been made. In order to solve such a problem that it is not possible to measure a signal due to malfunction of such devices, therefore, the following operation is performed. For example, in a case in which, at step S506 of FIG. 5, a k-th hand touch measurement signal transmitting unit malfunctions as shown in FIG. 4, i.e. in a case in which $X_{max}(k)=0$ and $Y_{max}(k)=0$, $N_x(k)$ and $N_y(k)$ are replaced with $N_x(k-1)$ and $N_y(k-1)$, respectively, such that, for example, $N_x(k)=N_x(k-1)$, to calculate coordinates, thereby preventing malfunction of the touch screen.

Figure 6:
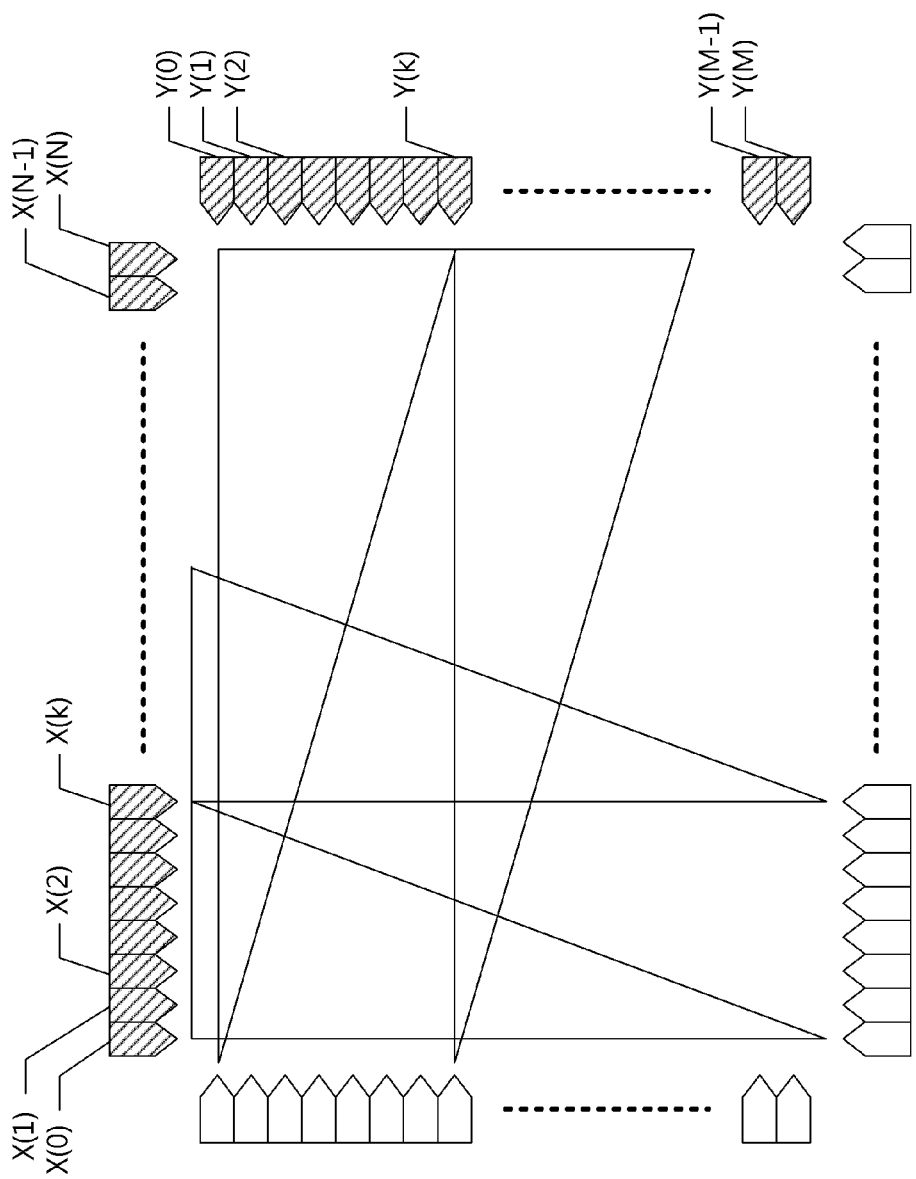
FIG. 6 is a view illustrating a principle of removing a ghost image based on transmission angles of touch measurement signal transmitting units in the multitouch recognizing device according to the present invention.

FIG. 6 is a view illustrating a process of removing a ghost image based on transmission angles of touch measurement signal transmitting units in the multitouch recognizing device according to the first embodiment of the present invention.

FIGS. 7 to 10 are views illustrating a principle of removing a ghost image based on transmission angles of the touch measurement signal transmitting units in the multitouch recognizing device according to the first embodiment of the present invention.

In order to remove a ghost image having multiple coordinates from a touch screen disposed in the form of a matrix, it is determined whether an object is present in the transmission angles of the touch measurement signal transmitting units and third coordinates are measured to remove a ghost image as shown in FIG. 6. The ghost image is removed at step S515 of FIG. 7.

Figure 7:
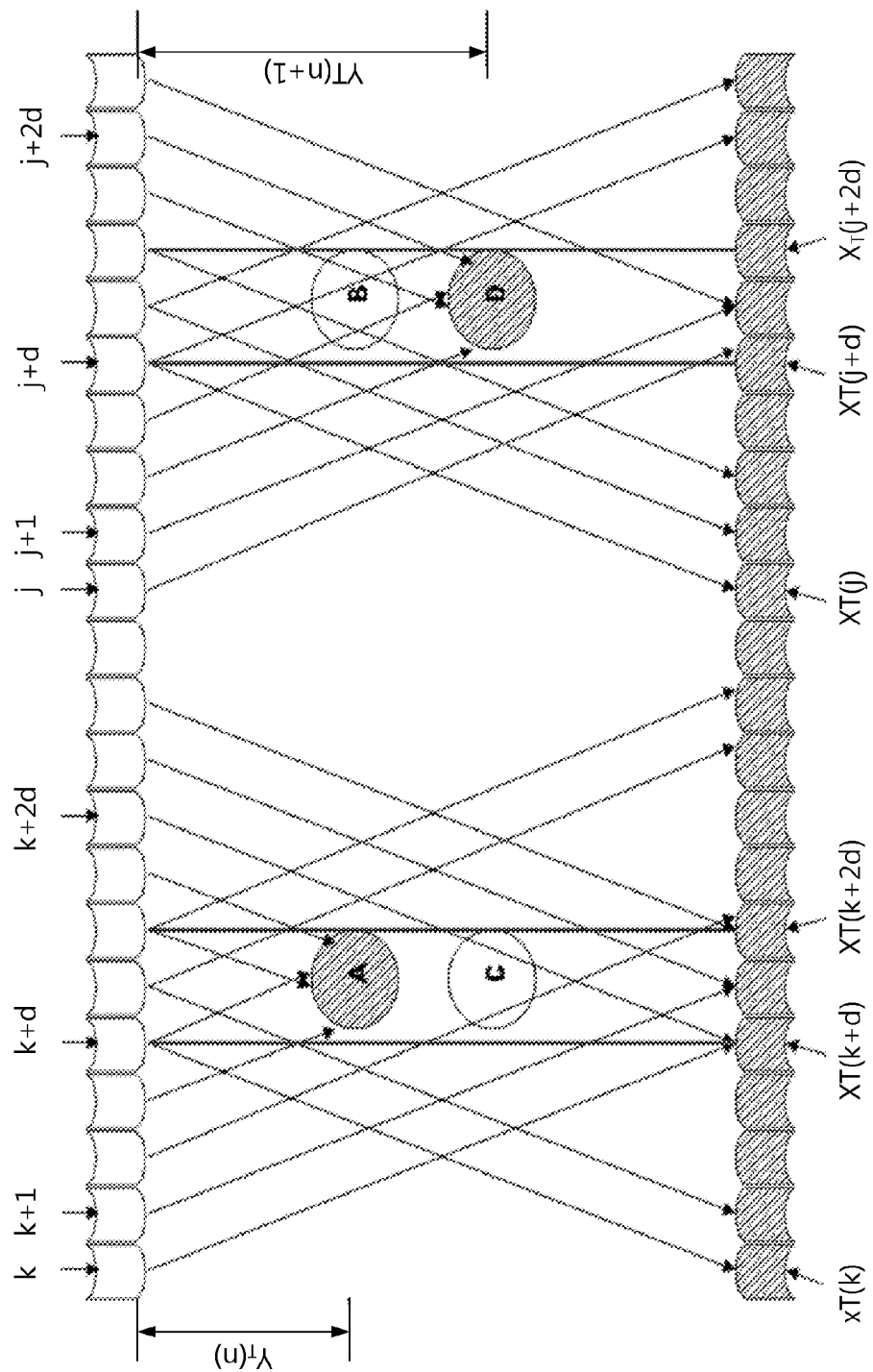
FIGS. 7 to 10 are views illustrating a principle of removing a ghost image based on transmission angles of the touch measurement signal transmitting units in the multitouch recognizing device according to the present invention.

In FIG. 7, when a touch measurement signal is transmitted by a (k+d)-th touch measurement signal transmitting unit, a k-th touch measurement signal receiving unit receives the transmitted touch measurement signal through oblique scanning to measure X(k).

In the same manner, when a touch measurement signal is transmitted by a k-th touch measurement signal transmitting unit, a (k+d)-th touch measurement signal receiving unit receives the transmitted touch measurement signal through oblique scanning to measure X(k+d).

In this case, a method of determining whether, in moving courses of touch measurement signals transmitted by the touch measurement signal transmitting units, the touch measurement signals are interfered with by an object and measuring third coordinates, which will hereinafter be described, to remove a ghost image from a touch surface on which distances from the touch measurement signal receiving units of a real touch region are disposed in the form of a matrix will be described with reference to FIG. 7. The ghost image is removed at step S715 of FIG. 7.

Figure 9:
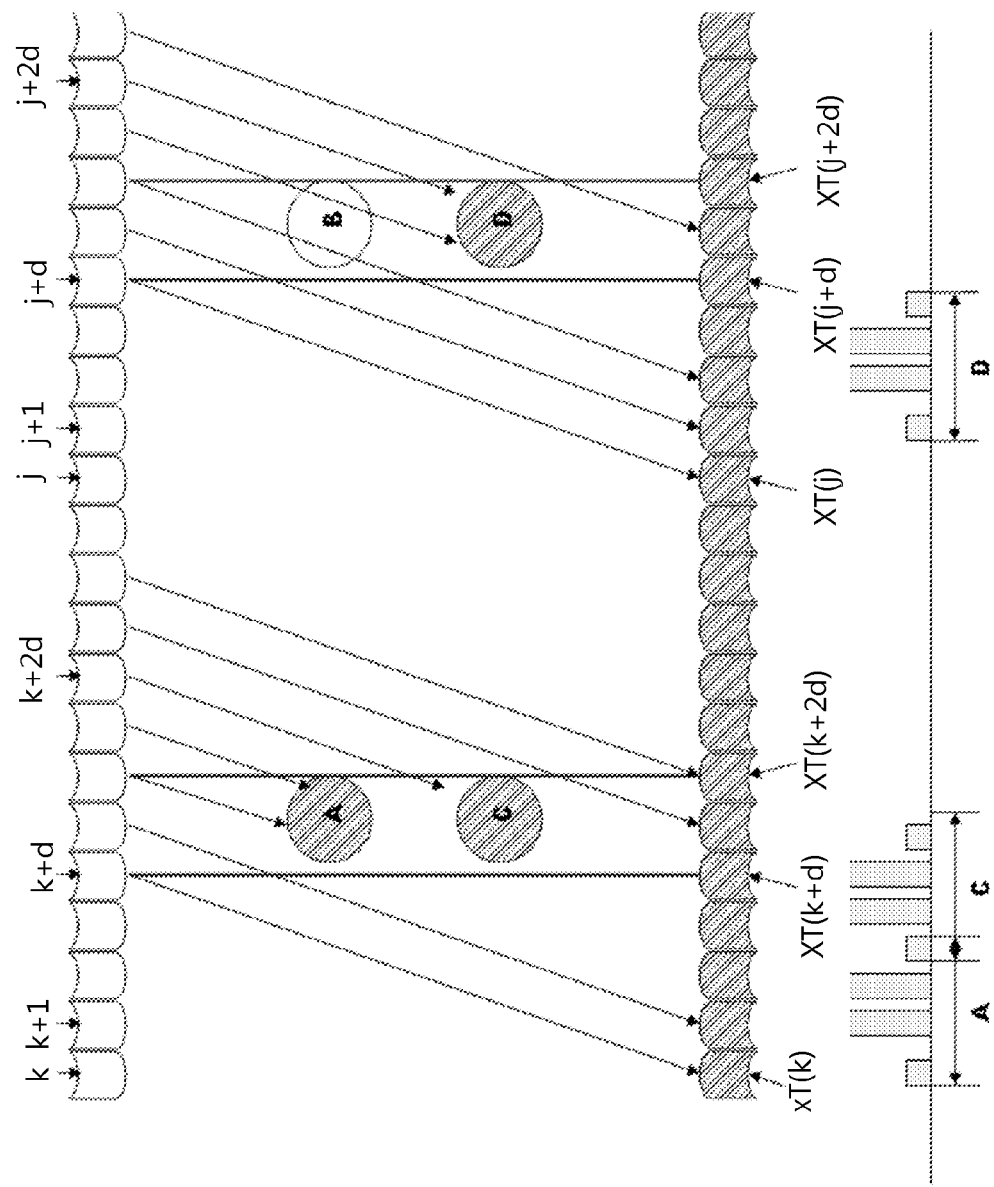

In FIG. 9, when a touch measurement signal is transmitted by a (k+d)-th touch measurement signal transmitting unit, a k-th touch measurement signal receiving unit receives the transmitted touch measurement signal through oblique scanning to measure a touch point.

Figure 8:
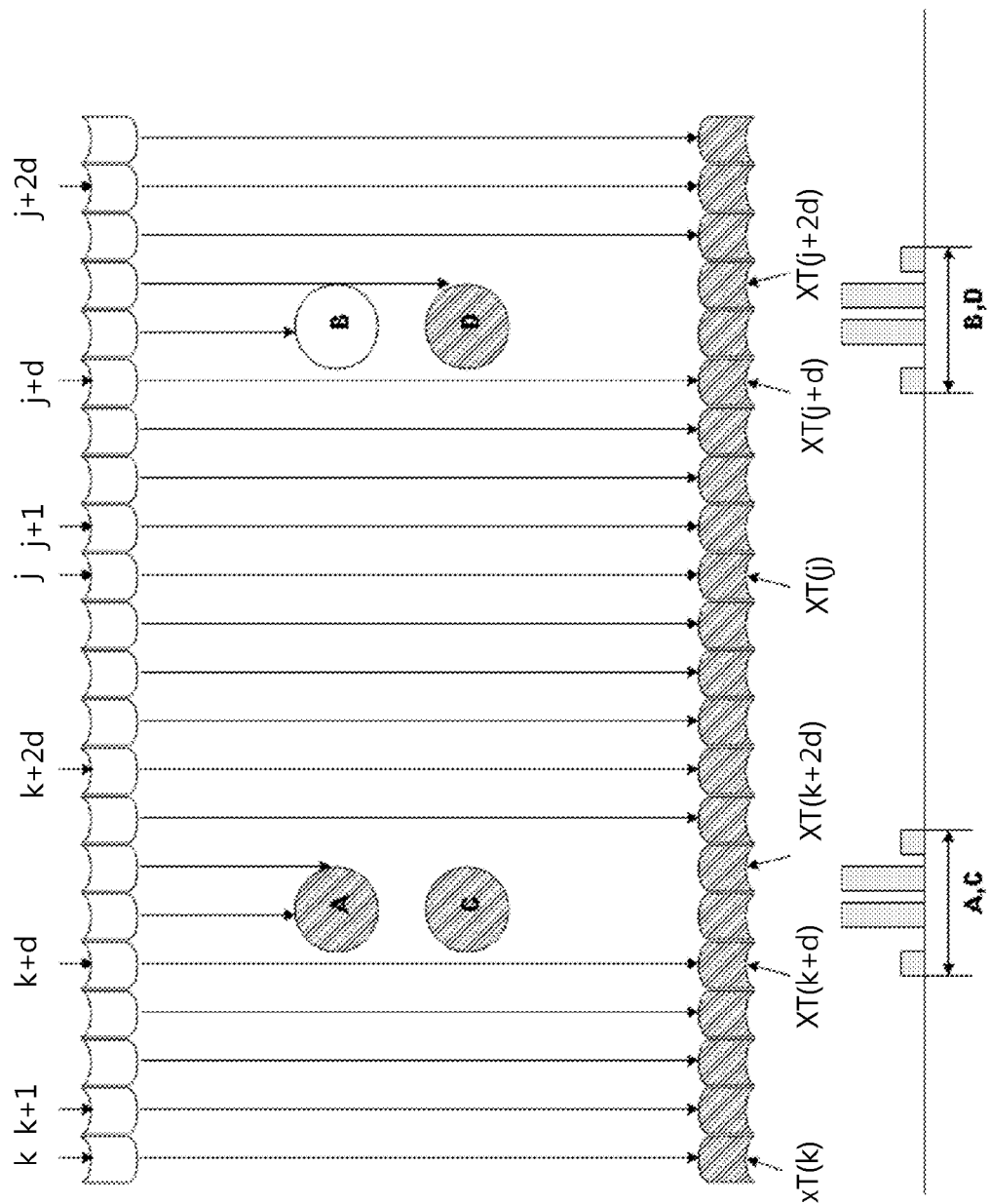

In FIG. 8, when a touch measurement signal is transmitted by a k-th touch measurement signal transmitting unit, a (k+d)-th touch measurement signal receiving unit receives the transmitted touch measurement signal through oblique scanning to measure a touch point.

In this case, on the assumption that distances from the touch measurement signal receiving units to a real touch region in FIG. 7 are y(n) and y(n+1) [$y_T(n)$ and $y_{T+1}(n)$ are shown in FIG. 7], y(n) and y(n+1) are calculated by Equations 11 and 12 below.

$$y(n) = \frac{\sum_{i=0}^{d} W_T \times (i+1) \times N_x(k+i)}{\sum_{i=0}^{d} N_x(k+i)} \quad \text{Equation 11}$$

$$y(n+1) = \frac{\sum_{i=0}^{d} W_T \times (i+1) \times N_x(j+i)}{\sum_{i=0}^{d} N_x(j+i)} \quad \text{Equation 12}$$

Where $W_T=S/d$, S is resolution of the X axis, d is a factor deciding an oblique angle during oblique scanning, i.e. an inclination degree of oblique scanning.

The ghost image is removed through the following steps.

Figure 10:
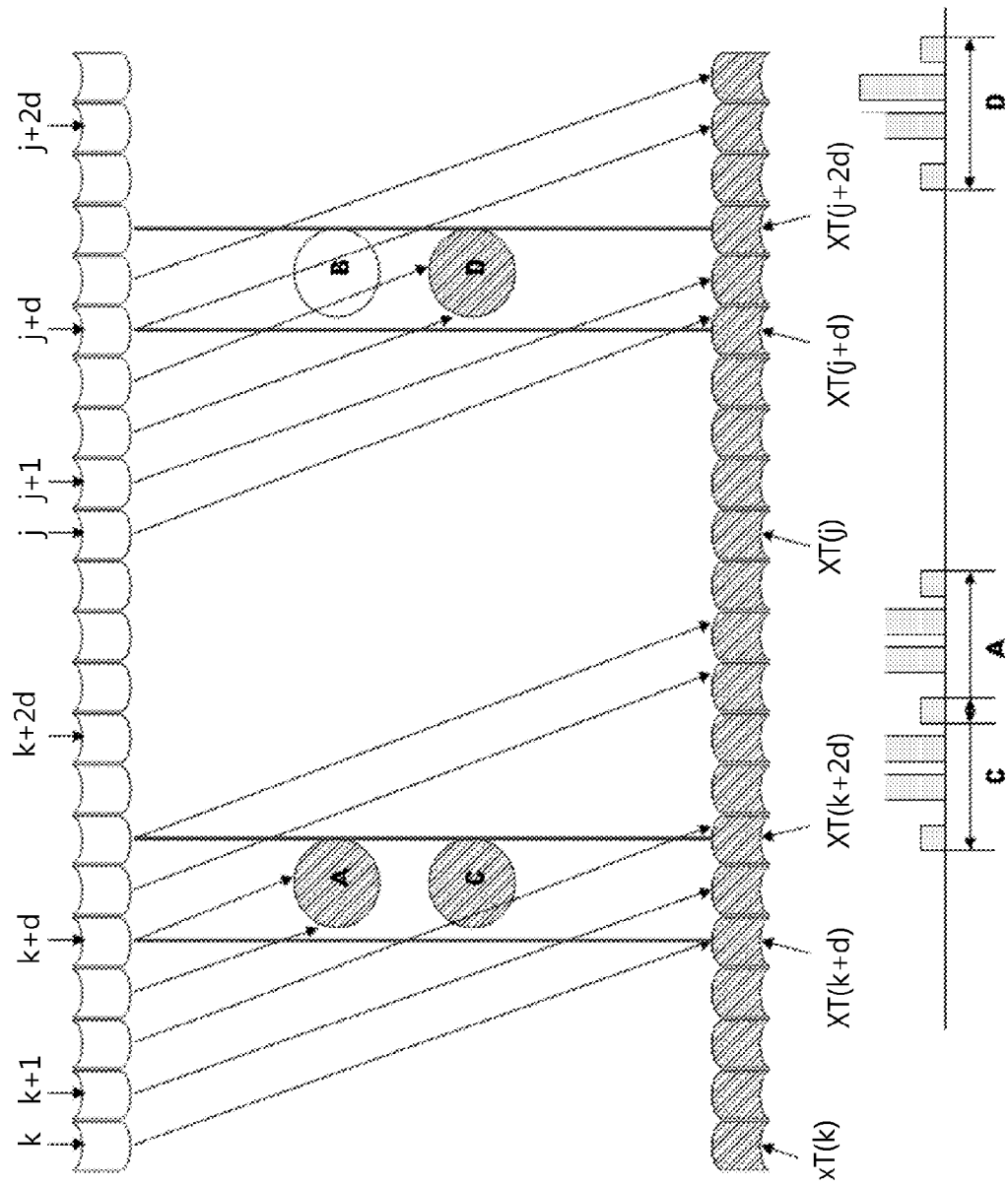

First, as shown in FIG. 8, touch measurement signal are transmitted in an orthogonal direction to measure coordinates of a touch region. At this time, in a case in which objects A, B, and C forming multiple points are placed on the touch surface, orthogonal coordinates of A, B, C, and D are measured in a state in which a ghost image B is not differentiated. However, in a case in which multiple points are scanned based on oblique signals as shown in FIGS. 9 and 10, touch objects A, C, and D are measured but the ghost image B is not measured.

Next, as shown in FIG. 9, touch measurement signals are transmitted by the touch measurement signal transmitting units such that oblique signals are directed in the left direction, i.e. such that the touch measurement signals have obtuse angles with respect to the bottom surface at the touch measurement signal receiving units, and the touch measurement signal receiving units scan the touch measurement signals transmitted by the touch measurement signal transmitting units to measure coordinates of the touch region.

Inclination coordinates corresponding to the coordinates including the ghost image measured through orthogonal coordinates are calculated by Equations 13 and 14 below.

The orthogonal coordinates are orthogonal coordinates [$x_O(n)$, $y_O(m)$] measured when the measurement signal receiving units scan touch objects at a right angle as shown in FIG. 8. The inclination coordinates ($X_{TC}$, $Y_{TC}$) corresponding to the coordinates including the ghost image are inclination coordinates ($X_{TC}$, $Y_{TC}$) at which touch objects are expected to be present during oblique scanning as shown in FIGS. 9 and 10. The inclination coordinates are converted through equations. That is, the inclination coordinates including the coordinates including the ghost image included in the orthogonal coordinates are converted through the following equations.

$$x_{TC}(n+m) = x_O(n) - y_O(m)\left(\frac{d}{Y_C}\right) \quad \text{Equation 13}$$

$$y_{TC}(n+m) = y_O(m) - x_O(n)\left(\frac{d}{X_C}\right) \quad \text{Equation 14}$$

In the above, the distances between the converted inclination coordinates ($X_{TC}$, $Y_{TC}$) calculated by Equations 13 and 14 and the coordinates ($X_T$, $Y_T$) obtained through scanning of the obliquely transmitted touch measurement signals are measured by Equations 15 and 16 below.

$$D_{xr} = |x_T(n) - x_{TC}(m)| \quad \text{Equation 15}$$

$$D_{yr} = |y_T(n) - y_{TC}(m)| \quad \text{Equation 16}$$

Where, $x_o(n)$ and $y_o(n)$ are coordinates including a ghost image obtained through orthogonal scanning and $X_c$ and $Y_c$ are the number of touch measurement signal receiving units which are used.

In a case in which $D_{xr}(n)$ and $D_{yr}(n)$ are greater than predetermined limit values, it is determined that the coordinates correspond to the ghost image. The predetermined limit values are preset according to density of infrared receiving unit sensors which are used.

As shown in FIG. 10, touch measurement signals are transmitted by the touch measurement signal transmitting units such that oblique angles are formed in the left direction, i.e. such that the touch measurement signals have acute angles with respect to the bottom surface at the touch measurement signal receiving units, and the touch measurement signal receiving units scan the received touch measurement signals to measure coordinates of the touch region.

Inclination coordinates ($X_{TC}$, $Y_{TC}$) corresponding to the coordinates including the ghost image measured through orthogonal coordinates [$x_o(n), y_o(m)$] are calculated by Equations 17 and 18 below.

$$x_{TC}(n+m) = x_O(n) + y_O(m)\left(\frac{d}{Y_C}\right) \quad \text{Equation 17}$$

$$y_{TC}(n+m) = y_O(m) + x_O(n)\left(\frac{d}{X_C}\right) \quad \text{Equation 18}$$

The distances between the calculated values ($X_{TC}$, $Y_{TC}$) and the coordinates ($X_T$, $Y_T$) obtained through scanning of the obliquely transmitted touch measurement signals are measured by Equations 19 and 20 below.

$$D_{xr}(n) = |x_T(n) - x_{TC}(n)| \quad \text{Equation 19}$$

$$D_{yr}(n) = |y_T(n) - y_{TC}(n)| \quad \text{Equation 20}$$

In a case in which $D_{xr}(n)$ and $D_{yr}(n)$ are greater than predetermined limit values, it is determined that the coordinates correspond to the ghost image. The predetermined limit values are preset according to density of infrared receiving unit sensors which are used.

In the above, $x_o(n)$ and $y_o(m)$ are coordinates including a ghost image obtained through orthogonal scanning and $X_c$ and $Y_c$ are the number of touch measurement signal receiving units which are used.

In a case in which oblique scanning is performed as shown in FIGS. 9 and 10, it should be noted that, when the touch measurement signal transmitting units transmit touch measurement signals, each touch measurement signal transmitting unit successively transmits an orthogonal touch measurement signal and an oblique (obtuse or acute) touch measurement signal to a corresponding touch measurement signal receiving unit and a surface connected to the touch measurement signal receiving unit.

That is, in the conventional art, all of the touch measurement signal transmitting units successively transmit orthogonal touch measurement signals and then all of the touch measurement signal transmitting units successively transmit oblique touch measurement signals. In the present invention, however, each touch measurement signal transmitting unit simultaneously transmits an orthogonal touch measurement signal and an oblique (obtuse or acute) touch measurement signal in a radial direction and coordinates and a diameter of a touch are calculated using the touch measurement signal received by a corresponding touch measurement signal receiving unit located at a predetermined angle, such as an obtuse angle, a right angle, or an acute angle, to the touch measurement signal transmitting unit.

Figure 11:
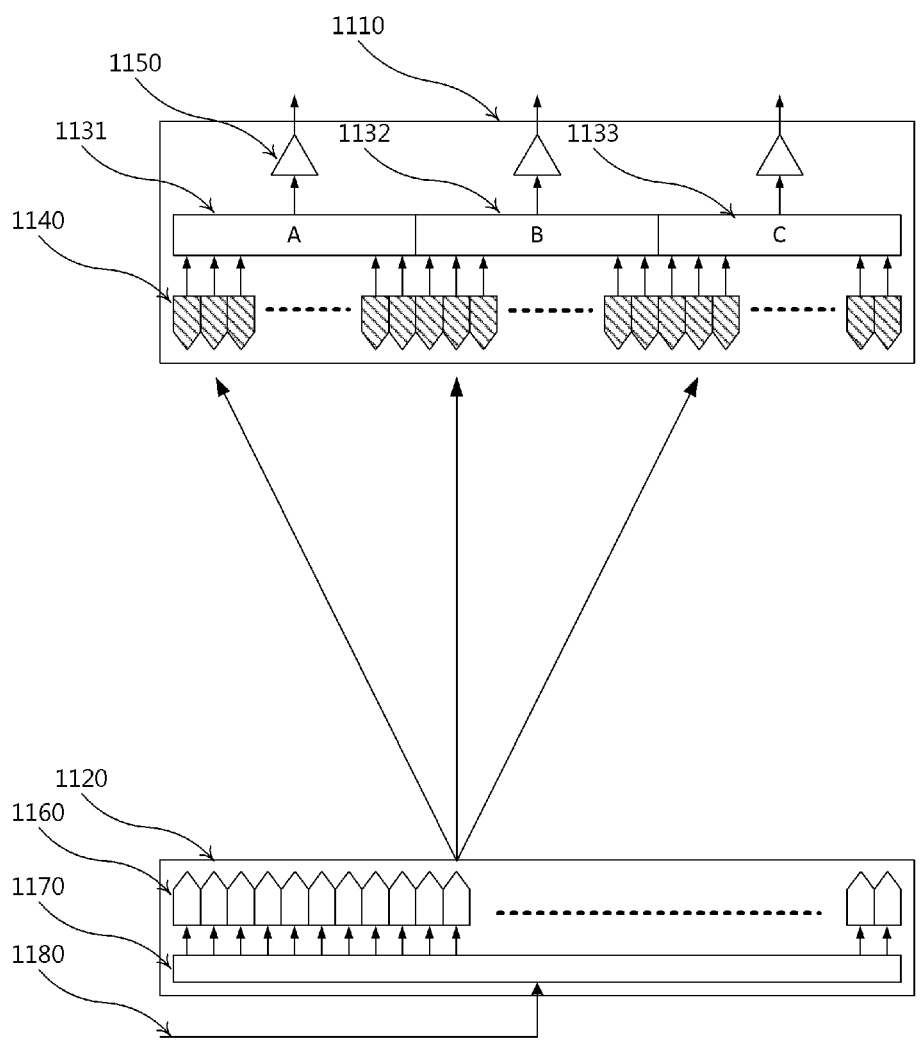
FIG. 11 is a view showing construction of a module type touch measurement signal receiving unit according to another embodiment of the multitouch recognizing device according to the present invention.
Figure 12:
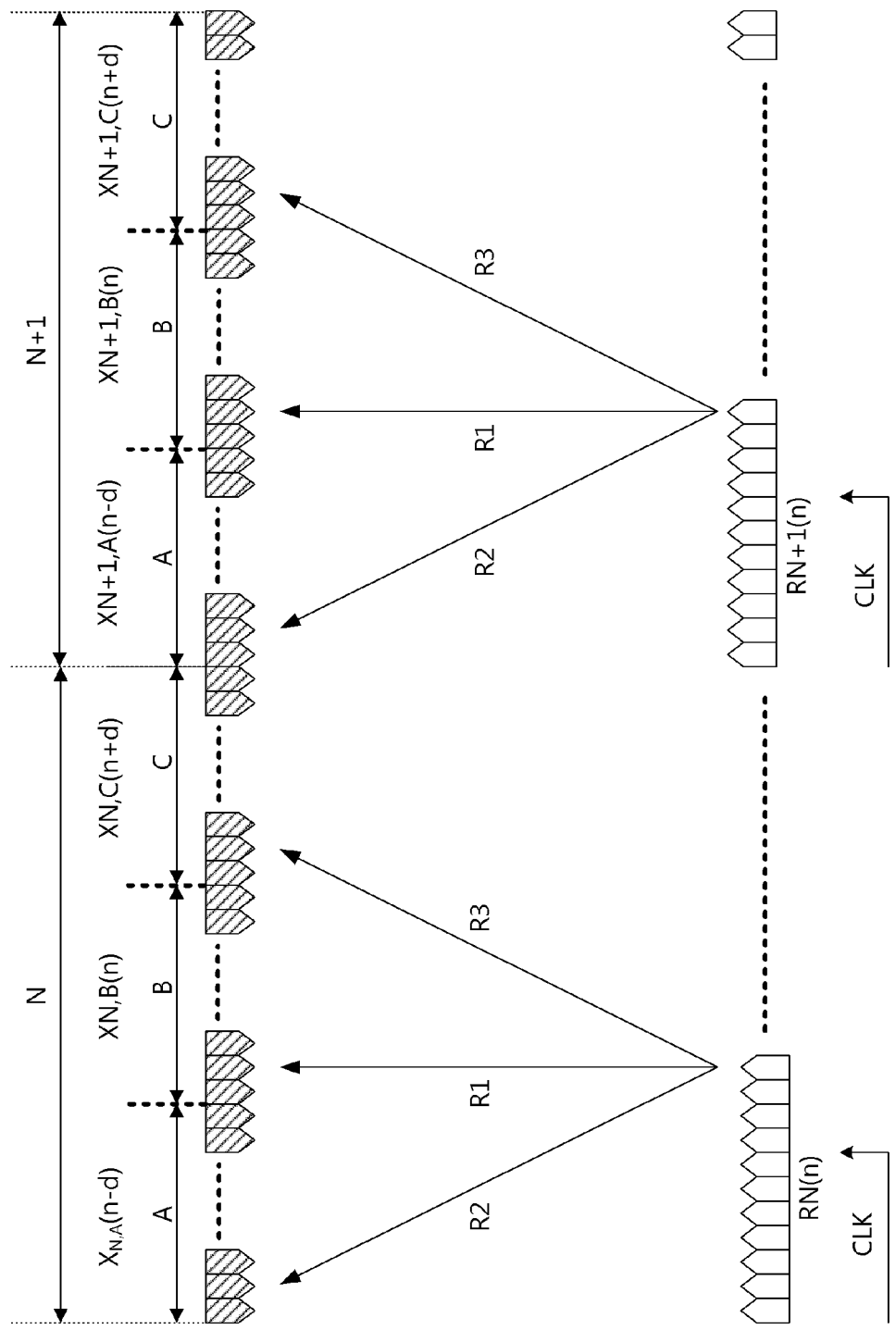
FIG. 12 is a view illustrating operation of the multitouch recognizing device including the module type touch measurement signal receiving unit.

FIG. 11 is a view showing construction of a multitouch recognizing device including a module type touch measurement signal receiving unit according to a second embodiment of the present invention and FIG. 12 is a view illustrating operation of the multitouch recognizing device including the module type touch measurement signal receiving unit according to the second embodiment of the present invention.

In the multitouch recognizing device according to the second embodiment of the present invention, each touch measurement signal transmitting unit 1160 transmits a touch measurement signal at predetermined angles in a radial direction, and three touch measurement signal receiving units 1140 located at a predetermined acute angle, right angle, and obtuse angle simultaneously receive the touch measurement signal. That is, a predetermined number of touch measurement signal receiving units 1140 are modularized and a predetermined number of receiving unit modules A, B, and C are combined to constitute a receiving unit module group 1110.

Meanwhile, a predetermined number of touch measurement signal transmitting units 1160 are also combined to constitute a transmitting unit group 1120.

The receiving unit modules A, B, and C convert touch measurement signals received by the measurement signal receiving units 1140 included in the respective receiving unit modules into voltage signals through receiving unit module signal conversion unit 1131, 1132, and 1133.

A/D conversion units 1150 for converting the voltage signals, which are analog signals, into digital signals are connected to the respective receiving unit modules A, B, and C such that the received values of the touch measurement signals converted into digital values are output to the control unit.

Meanwhile, although not shown in the drawings, a transmitting unit driving clock unit outputs a transmitting unit driving clock 1180 for simultaneously driving the touch measurement signal transmitting units 1160 having the same index included in the transmitting unit group 1120.

The transmitting unit driving clock 1180 of the transmitting unit driving clock unit is supplied to a transmitting unit driver 1170, which drives the touch measurement signal transmitting units 1160 to transmit the touch measurement signals at predetermined angles in a radial direction.

Operation of the multitouch recognizing device with the above-stated construction according to the second embodiment of the present invention will be described with reference to FIG. 12.

As described above, a predetermined number of touch measurement signal receiving units are combined to constitute receiving unit modules A, B, and C and a predetermined number of receiving unit modules A, B, and C are combined to constitute receiving unit module groups N and N+1. In addition, a predetermined number of touch measurement signal transmitting units are also combined to constitute transmitting unit groups $R_N$ and $R_{N+1}$.

When a driving clock CLK of the transmitting unit driving clock unit is supplied to the transmitting unit driver, the transmitting unit driver drives the transmitting units, i.e. $R_N(n)$ and $R_{N+1}(n)$, having the same index as the transmitting unit groups $R_N$ and $R_{N+1}$ designated by the driving clock to simultaneously transmit touch measurement signals including an acute touch measurement signal R2, a right touch measurement signal R1, and an obtuse touch measurement signal R3 in a radial direction.

At this time, the touch measurement signals radially transmitted from the touch measurement signal transmitting units of one transmitting unit group are received by the touch measurement signal receiving units constituting the receiving unit modules A, B, and C. The control unit calculates coordinates or a diameter of a touch based on the touch measurement signals received by the touch measurement signal receiving units located at predetermined angles, such as an obtuse angle, a right angle, and an acute angle, among the touch measurement signals radially transmitted by one touch measurement signal transmitting unit.

That is, the control unit calculates the coordinates or the diameter of the touch using only the touch measurement signals received by the touch measurement signal receiving units of the module A located at an acute angle to the touch measurement signal transmitting unit $R_N(n)$, the touch measurement signals received by the touch measurement signal receiving units of the module B located at a right angle to the touch measurement signal transmitting unit $R_N(n)$, and the touch measurement signals received by the touch measurement signal receiving units of the module C located at an obtuse angle to the touch measurement signal transmitting unit $R_N(n)$ among the touch measurement signals transmitted by the touch measurement signal transmitting unit $R_N(n)$.

The touch measurement signals received by the respective touch measurement signal receiving units using the above method are calculated by Equation 1 to Equation 20 as previously described in the first embodiment to measure the position of the touch.

In the second embodiment of the present invention, the touch measurement signal transmitting units having the same index as the transmitting unit groups $R_N$ and $R_{N+1}$ simultaneously transmit touch measurement signals and the touch measurement signal receiving units receive at least one touch measurement signal per receiving unit module A, B, or C using the above method. Consequently, it is possible to more rapidly measure the touch position and to more accurately measure the touch position than in the first embodiment. Even when the touch position rapidly changes, therefore, it is possible to rapidly and accurately measure the touch position.

Figure 13:
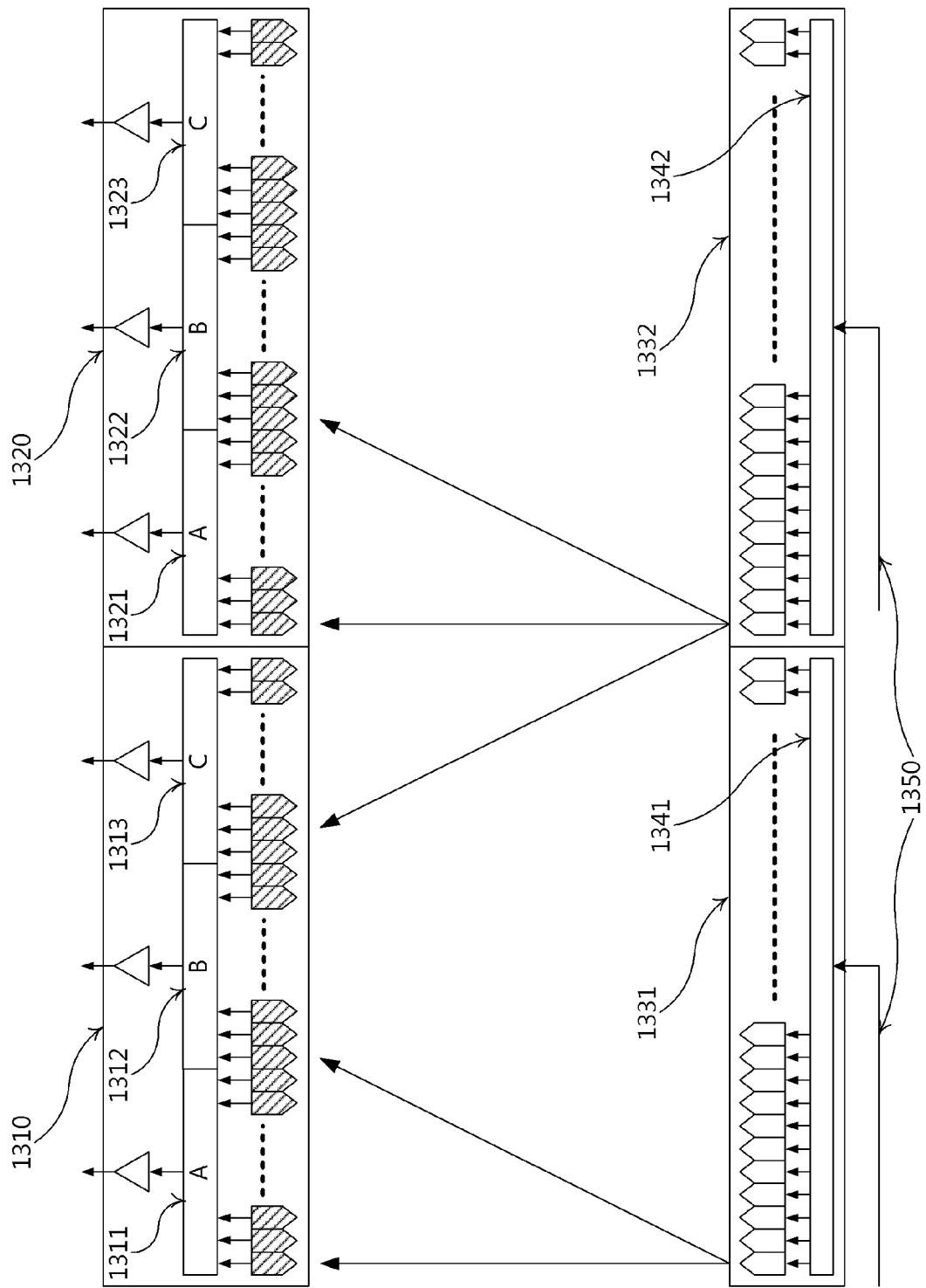
FIG. 13 is a view illustrating a principle in which receiving unit modules of adjacent transmitting and receiving module groups operate together.
Figure 14:
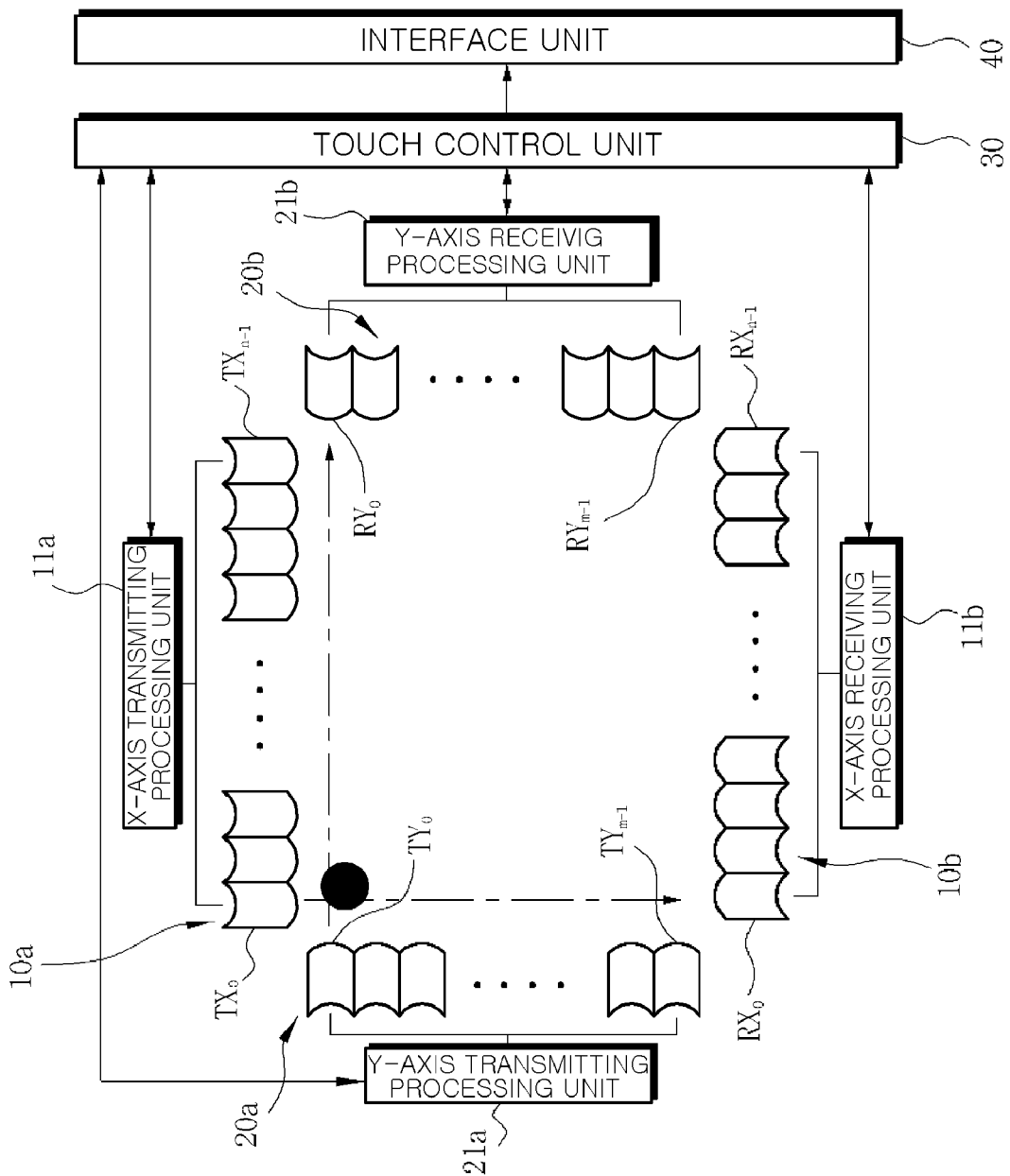
FIG. 14 is a view schematically showing construction of a conventional multitouch screen device.

FIG. 13 is a view illustrating a principle in which receiving unit modules of adjacent transmitting and receiving module groups operate together in the second embodiment of the present invention.

As shown in FIG. 13, in the second embodiment of the present invention, acute touch measurement signals, among touch measurement signals transmitted by touch measurement signal transmitting units of adjacent transmitting module groups 1330 and 1340, may be received by touch measurement signal receiving units in receiving unit modules 1311 to 1313 and 1321 to 1323 of adjacent receiving module groups 1310 and 1320. Consequently, some of the receiving unit modules of the receiving module groups 1310 and 1320 may be configured to at least receive touch measurement signals irrespective of which transmitting module groups 1330 and 1340 the touch measurement signal transmitting units transmitting the touch measurement signals belong to.

In the above example, the touch measurement signal receiving units are grouped into A, B, and C. In a case in which a predetermined number of touch measurement signal receiving units are grouped, however, N receiving unit modules may be included in one receiving module group.

In addition, in the above example, the number of the receiving module groups is 2. According to configuration, however, two or more receiving module groups may be provided.

Specifically, all touch measurement signal receiving units may be divided into M receiving module groups, one receiving module group may be divided into N receiving unit modules, and one receiving unit module may include C touch measurement signal receiving units. On the assumption that the total number of touch measurement signal receiving units on the X-axis is X, therefore, it is realized that X=N×M×C.

INDUSTRIAL APPLICABILITY

The present invention is applicable to a display industry.

The invention claimed is:

1. A multitouch recognizing device comprising:
a transmitting module comprising at least one transmitting element for radially transmitting a touch measurement signal comprising a pulse;
a receiving module comprising at least one receiving element for receiving the touch measurement signal transmitted by the transmitting module;
a control unit for calculating coordinates or a diameter of a touch region based on the touch measurement signal received by the receiving module; and
a touch panel for allowing a user to input a touch input,
wherein the at least one receiving element located at a right angle, an obtuse angle, and an acute angle to the transmitting element successively receives the touch measurement signal radially transmitted by the transmitting element as an orthogonal, acute, or obtuse touch measurement signal,
wherein the control unit calculates orthogonal coordinates obtained by the orthogonal touch measurement signal of touch coordinates using the following first and second equations respectively, $$x(n) = \frac{\sum_{i}^{i+w} W \times (i+1) \times N_x(i)}{\sum_{i}^{i+w} N_x(i)}; \text{ and}$$

$$y(n) = \frac{\sum_{j}^{j+h} H \times (j+1) \times N_y(j)}{\sum_{i}^{j+h} N_y(j)},$$

wherein $N_x(i)$ is a X-axis touch measurement signal measurement value, $N_y(j)$ is a Y-axis touch measurement signal measurement value, x(n) is a X-axis touch region coordinate, y(n) is an Y-axis touch region coordinate, k is an index of the receiving element having a natural number of 0 to N for a X axis and 0 to M for a Y axis, i is an index of a X-axis touch measurement signal receiving unit, j is an index of a Y-axis touch measurement signal receiving unit, w is the number of X-axis touch region receiving units, h is the number of Y-axis touch region receiving units, and W=S/N and H=S/M, where S is the maximum resolution of a screen and N and M are the number of X-axis and Y-axis signal transmitting units, respectively.

2. A multitouch recognizing device comprising:
a plurality of transmitting unit groups constituted by grouping touch measurement signal transmitting units for radially transmitting successive touch measurement signals to a plurality of receiving module groups comprising at least three receiving modules located at a right angle, an acute angle, and an obtuse angle to the transmitting unit groups for simultaneously receiving the touch measurement signals transmitted by the transmitting unit groups such that each of the plurality of receiving modules simultaneously receives the touch measurement signals at the right angle, the acute angle, and the obtuse angle;

a transmitting unit driving clock unit for providing a driving clock to simultaneously drive the touch measurement signal transmitting units having the same index in each of the transmitting unit groups;

a control unit for calculating a x coordinate, a y coordinate, and a touch point diameter of a touch region based on the touch measurement signals received by the receiving module groups; and a touch panel for allowing a user to input an touch input, wherein the control unit calculates orthogonal coordinates obtained by the orthogonal touch measurement signal of touch coordinates using the following first and second equations, respectively:

$$x(n) = \frac{\sum_{i}^{i+w} W \times (i+1) \times N_x(i)}{\sum_{i}^{i+w} N_x(i)}; \text{ and}$$

$$y(n) = \frac{\sum_{j}^{j+h} H \times (j+1) \times N_y(j)}{\sum_{j}^{j+h} N_y(j)},$$

wherein $N_x(i)$ is a X-axis touch measurement signal measurement value, $N_y(j)$ is a Y-axis touch measurement signal measurement value, $x(n)$ is a X-axis touch region coordinate, $y(n)$ is a Y-axis touch region coordinate, k is an index of the receiving element having a natural number of 0 to N for a X axis and 0 to M for a Y axis, i is an index of a X-axis touch measurement signal receiving unit, j is an index of a Y-axis touch measurement signal receiving unit, w is the number of X-axis touch region receiving units, h is the number of Y-axis touch region receiving units, and W=S/N and H=S/M, where S is the maximum resolution of a screen and N and M are the number of X-axis and Y-axis signal transmitting units, respectively.

3. The multitouch recognizing device according to claim 2, wherein the orthogonal coordinates are converted into inclination coordinates having an acute or obtuse angle corresponding thereto to determine whether a ghost image is present.

4. The multitouch recognizing device according to claim 3, wherein determination as to whether the ghost image is present is performed based on obtuse inclination coordinates obtained by converting the orthogonal coordinates using the following third and fourth equations respectively:

$$x_{TC}(n+m) = x_O(n) - y_O(m)\left(\frac{d}{Y_C}\right); \text{ and}$$

$$y_{TC}(n+m) = y_O(m) - x_O(n)\left(\frac{d}{X_C}\right),$$

wherein $x_o(n)$ and $y_o(n)$ are coordinates comprising a ghost image obtained through orthogonal scanning, $X_c$ and $Y_c$ are the number of sensors used in each sensor unit, d is a factor deciding an acute or obtuse angle during acute or obtuse scanning, n is the number of touch objects on the X axis, and m is the number of touch objects on the Y axis.

5. The multitouch recognizing device according to claim 3, wherein determination as to whether the ghost image is present is performed based on acute inclination coordinates obtained by converting the orthogonal coordinates using the following fifth and sixth equations respectively:

$$x_{TC}(n+m) = x_O(n) + y_O(m)\left(\frac{d}{Y_C}\right); \text{ and}$$

$$y_{TC}(n+m) = y_O(m) + x_O(n)\left(\frac{d}{X_C}\right),$$

wherein $x_o(n)$ and $y_o(m)$ are coordinates comprising a ghost image obtained through orthogonal scanning, $X_c$ and $Y_c$ are the number of touch measurement signal receiving units which are used, d is a factor deciding an acute or obtuse angle during acute or obtuse scanning, n is the number of touch objects on the X axis, and m is the number of touch objects on the Y axis.

6. The multitouch recognizing device according to claim 4, wherein, it is determined that the ghost image is present in a case in which $D_{xr}(n)$ and $D_{yr}(n)$ decided by the following seventh and eighth equations respectively are equal to or greater than predetermined limit values:

$$D_{xr}(n) = |x_T(n) - x_{TC}(n)|; \text{ and}$$

$$D_{yr}(n) = |y_T(n) - y_{TC}(n)|,$$

wherein $X_T$ and $Y_T$ are measured coordinates of a real touch object during oblique scanning and $X_{TC}$ and $Y_{TC}$ are inclination coordinates converted from the orthogonal coordinates.

7. A multitouch recognizing device comprising:

a plurality of transmitting unit groups constituted by grouping touch measurement signal transmitting units for radially transmitting successive touch measurement signals to a plurality of receiving module groups comprising at least three receiving modules located at a right angle, an acute angle, and an obtuse angle to the transmitting unit groups for simultaneously receiving the touch measurement signals transmitted by the transmitting unit groups such that each of the plurality of receiving modules simultaneously receives the touch measurement signals at the right angle, the acute angle, and the obtuse angle;

a transmitting unit driving clock unit for providing a driving clock to simultaneously drive the touch measurement signal transmitting units having the same index in each of the transmitting unit groups;

a control unit for calculating a x coordinate, a y coordinate, and a touch point diameter of a touch region based on the touch measurement signals received by the receiving module groups; and a touch panel for allowing a user to input an touch input,
wherein coordinate values measured from the touch region are calculated and used as normalized touch measurement values ($N_x(k)$, $N_y(k)$),
wherein the measured coordinate values of the touch region are normalized by the following first and second equations respectively:

$$N_x(k) = \frac{(X_{max}(k) - X(k))^n}{(X_{max}(k))^n} \times G; \text{ and}$$

$$N_y(k) = \frac{(Y_{max}(k) - Y(k))^n}{(Y_{max}(k))^n} \times G,$$

wherein $N_x(k)$ is a normalized value of a X-axis touch measurement signal measurement value, $N_y(k)$ is a normalized value of a Y-axis touch measurement signal measurement value, k is an index of the receiving element having a natural number of 0 to N for a X axis and 0 to M for a Y axis, G is a scaling value having a natural number of 1 to 100, n is a natural number of 1 or 2 deciding whether to linearly or nonlinearly set a reaction degree of a noise component of a signal, and $X_{max}$ and $Y_{max}$ are the largest values of touch signals measured at the X axis and the Y axis, respectively, wherein the normalized measurement values ($N_x(k)$, $N_y(k)$) of the touch region are corrected by the following third and fourth equations respectively:

$$P_x(k) = \sum_{i=0}^{l} N_x(k+i) \times S_x(i); \text{ and}$$

$$P_y(k) = \sum_{i=0}^{l} N_y(k+i) \times S_y(i), \text{ and}$$

wherein $P_x(k)$ is a X-axis correction function value, $P_x(k)$ is a Y-axis correction function value, $S_x(i)$ is a X-axis matching filter function, Sy(i) is a Y-axis matching filter function, and k is an index of the receiving element, and l is the sampling number of a matching filter.

8. The multitouch recognizing device according to claim 7, wherein the coordinates or the diameter of the touch region is calculated using values greater than a predetermined first reference value ($T_{lower}$) and less than a predetermined second reference value ($T_{higher}$) among the normalized values ($N_x$, $N_y$) of the measured touch signals.

9. The multitouch recognizing device according to claim 8, wherein the first reference value ($T_{lower}$) and the predetermined second reference value ($T_{higher}$) are decided by probability density functions calculated by the following fifth and sixth equations respectively:

$$T_x(n) = \left(\sum_{i}^{i+w} N_x(i)\right)/W \qquad \text{Equation 7}$$

$$T_y(n) = \left(\sum_{j}^{j+h} N_y(j)\right)/H \qquad \text{Equation 8}$$

wherein $T_x(k)$ is a X-axis probability density function value, $T_y(k)$ is a Y-axis probability density function value, i is a X-axis receiving element index, j is a Y-axis receiving element index, w is the number of X-axis touch region receiving elements, h is the number of Y-axis touch region receiving elements, $N_x(i)$ is a X-axis touch measurement signal measurement value, $N_y(j)$ is a Y-axis touch measurement signal measurement value, i is an index of a X-axis touch measurement signal receiving unit, j is an index of a Y-axis touch measurement signal receiving unit, w is the number of X-axis touch region receiving units, h is the number of Y-axis touch region receiving units, and W=S/N and H=S/M, where S is the maximum resolution of a screen and N and M are the number of X-axis and Y-axis signal transmitting units, respectively.

10. The multitouch recognizing device according to claim 2, wherein the control unit calculates the diameter [dx(n), dy(n)] of the touch region based on the touch measurement signals to determine whether a touch recognition condition is satisfied.

11. The multitouch recognizing device according to claim 2, wherein the transmitting elements and the receiving elements are alternately arranged on the same line.

12. The multitouch recognizing device according to claim 1, wherein coordinate values measured from the touch region are calculated and used as normalized touch measurement values ($N_x(k)$, $N_y(k)$).

13. The multitouch recognizing device according to claim 1, wherein the control unit calculates the diameter of the touch region based on the touch measurement signals to determine whether a touch recognition condition is satisfied.

14. The multitouch recognizing device according to claim 1, wherein the transmitting elements and the receiving elements are alternately arranged on the same line.

\* \* \* \* \*